United States Patent
Wang

(10) Patent No.: US 12,053,831 B2
(45) Date of Patent: Aug. 6, 2024

(54) STEP DRILL BIT AND METHOD FOR DRILLING A WORKPIECE BY USING A STEP DRILL BIT

(71) Applicant: Hongjia Wang, Shanghai (CN)

(72) Inventor: Hongjia Wang, Shanghai (CN)

( * ) Notice: Subject to any disclaimer, the term of this patent is extended or adjusted under 35 U.S.C. 154(b) by 0 days.

(21) Appl. No.: 18/139,839

(22) Filed: Apr. 26, 2023

(65) Prior Publication Data

US 2024/0066610 A1     Feb. 29, 2024

Related U.S. Application Data

(63) Continuation of application No. PCT/CN2022/134173, filed on Nov. 24, 2022.

(30) Foreign Application Priority Data

Aug. 24, 2022 (CN) .......................... 202211018644.4

(51) Int. Cl.
    *B23B 51/00*     (2006.01)
    *B23B 35/00*     (2006.01)

(52) U.S. Cl.
    CPC ............ *B23B 51/009* (2013.01); *B23B 35/00* (2013.01)

(58) Field of Classification Search
    CPC .. B23B 51/009; B23B 51/08; B23B 2251/087
    See application file for complete search history.

(56) References Cited

U.S. PATENT DOCUMENTS

| | | | |
|---|---|---|---|
| 9,409,239 B2* | 8/2016 | Higashiwaki | B23B 51/009 |
| 9,687,915 B2* | 6/2017 | Durfee | B23B 51/009 |
| 10,328,500 B2* | 6/2019 | Morton | B24B 19/04 |
| 2011/0116884 A1* | 5/2011 | Li | B23B 51/02 |
| | | | 408/230 |
| 2012/0195704 A1* | 8/2012 | White | B23B 51/0081 |
| | | | 408/224 |
| 2017/0129022 A1 | 5/2017 | Durfee | |
| 2018/0133808 A1 | 5/2018 | Wang | |
| 2020/0094331 A1 | 3/2020 | Wang | |

FOREIGN PATENT DOCUMENTS

| | | |
|---|---|---|
| CN | 203356678 | 12/2013 |
| CN | 104227088 | 12/2014 |
| CN | 110802259 | 2/2020 |
| CN | 211464929 | 9/2020 |
| CN | 112828351 | 5/2021 |
| CN | 214602093 | 11/2021 |

OTHER PUBLICATIONS

International Search Report and Written Opinion for PCT Application No. PCT/CN2022/134173 mailed May 20, 2023, 8 pages.

* cited by examiner

*Primary Examiner* — Eric A. Gates
(74) *Attorney, Agent, or Firm* — Ervin Cohen & Jessup LLP; Kelly W. Cunningham

(57) ABSTRACT

A step drill bit having a hole processing portion and at least two flutes extending on the hole processing portion, the hole processing portion comprising step sections, each step section and the at least two flutes forming at least two cutting edges distributed in a circumferential direction of the step section, each cutting edge having a tooth profile, wherein the first cutting edge and the second cutting edge are at least partially different from each other in the structure of their respective tooth profiles.

24 Claims, 14 Drawing Sheets

STEP DRILL BIT AND METHOD FOR DRILLING A WORKPIECE BY USING A STEP DRILL BIT

CROSS-REFERENCE TO RELATED APPLICATIONS

This application is a national phase entry application that claims priority to International Application No. PCT/CN2022/134173, titled "Step Drill and Method for Drilling a Workpiece by Using a Step Drill," filed Nov. 24, 2022, which claims priority to Chinese Patent Application No. 202211018644.4, titled "Step Drill and Method for Drilling a Workpiece by Using a Step Drill," filed Aug. 24, 2022, the contents of which are incorporated by reference herein in their entirety.

TECHNICAL FIELD

The present invention relates to a step drill bit and a method for drilling a workpiece by using a step drill bit.

BACKGROUND ART

A step drill bit is a kind of pagoda-shaped drill bit consisting of a drill tip, an adjacent reaming portion with a stair-step profile, and a shank portion. It is called a "step drill" because of its shape. The stair-step profile is formed by a plurality of step sections increasing step by step against a drilling direction, each step section comprising a truncated cone section and an adjacent cylindrical section. The step drill bit is provided with at least one flute or chip discharging flute or edge flute on its drill tip and reaming portion, the flute intersecting with a surface of the truncated cone section to form a reaming major cutting edge. A plurality of flutes are provided on the same truncated cone surface forming a plurality of reaming major cutting edges.

A method of using the step drill bit is as follows: activating the step drill bit, drilling an initial small hole with the drill tip, and then, obtaining required hole diameters by reaming step by step. Using one step drill bit, holes with multiple diameters can be drilled (or reamed) as a workpiece is once chucked.

The step drill bit is an ideal choice for sheet metal drilling. It is adapted for cutting a nonferrous metal with a thickness of 1.5 mm, a plastic or wooden material with a maximum thickness of 4.0 mm, and a steel sheet with a thickness of 4.0 mm.

Referring to FIGS. 1 and 2, a prior art step drill bit 100 is shown. The prior art step drill bit 100 generally has two symmetrical oblique flutes or spiral flutes 105, 105' (as shown in FIG. 1) or straight flutes (not shown). Each reaming major cutting edge A'n on each step section T'n of the step drill bit 100 is one single segment, that is, one single segment of a straight line (when the flute is a straight flute) or one single segment of a curved line (when the flute is an oblique flute or rather spiral flute 105, 105'). FIG. 1 shows a one-segment style, curved line section in the case of oblique flutes or spiral flutes 105, 105'.

As shown in FIG. 1 and FIG. 2, the major cutting edges on the first spiral flute 105 are A'1, A'2 ... A'i ... A'n, respectively. Normal cutting angles of cutting edges on the first spiral flute 105 are: rake angle γn, relief angle σn, edge inclination angle (spiral angle) β and entering and auxiliary angles λ, which are oriented on the step drill bit 100 according to traditional step drill bit design rules and requirements.

Major cutting edges on the second spiral flute 105' (which are symmetrically distributed at 180° with respect to the first spiral flute 105 on the circumference) are respectively A'1, A'2' ... A'i' ... A'n', which are identical to the corresponding major cutting edges on the first spiral flute 105 in structure, namely: A'1'=A'1, A'2'=A'2, ... A'i'=A'i, A'n'=A'n. Additionally, normal cutting angles of cutting edges on the second spiral flute 105' are rake angle γn', relief angle σn', edge inclination angle (spiral angle) β' and entering and auxiliary angles λ', which are distributed according to the same step drill bit design rules and requirements as for the first spiral flute 105, namely: γn'=γn, σn'=σn, β'=β, λ'=λ.

Accordingly, the major cutting edges on each step section T'n are symmetrical by 180° in the circumferential direction, such that their cutting functions are the same. In view of this, referring to the shaded portion as shown in FIG. 10, this shaded portion indicates the cutting area of each major cutting edge on the same step section T'n, which has a cutting depth of f/2 and a cutting length A'n corresponding to the entire major cutting edge length A'n. The cutting area cut by each major cutting edge is exactly the same, and all of the major cutting edges are cut over the whole cutting length A'n.

However, in practice, it is found that the traditional step drill bit with the above design has some problems, such as a large cutting force, insufficient cutting sharpness, difficultly in chip breaking, producing high cutting heat and producing low processing efficiency.

SUMMARY OF THE INVENTION

Therefore, the present invention is intended to provide a step drill bit and a method for drilling a workpiece by using a step drill bit, by which at least one of said technical problems existing in the prior art can be solved.

According to one aspect of the present invention, the method of using a step drill bit comprises providing a step drill bit having a hole processing portion and at least two flutes extending on the hole processing portion, the hole processing portion comprising one or more step sections, each step section and the at least two flutes forming at least two cutting edges distributed in a circumferential direction of the step section. Wherein, the at least two cutting edges on at least one of the step sections, comprise a first cutting edge and a second cutting edge, wherein, the first cutting edge and the second cutting edge are respectively constructed in at least two-segment style, and therefore respectively include at least two cutting edge segments. Thus, the first cutting edge and the second cutting edge are at least partially different from each other in the structure of their cutting edge segments. Additionally, one cutting edge of the first cutting edge and the second cutting edge can be formed in one-segment style, while the other cutting edge is formed in a at least two-segment style, and thus includes at least two cutting edge segments.

In the present invention, the term "structure" should be broadly understood, and it can include geometric structures or parameters such as the geometric shape (e.g., straight or curved edge, entering/auxiliary angle λ, etc.), size or number of each cutting edge segment/cutting edge segments.

The technical effects that the drill bit can produce include, but are not limited to: changing the initial one-section linear cutting edge into multi-segment cutting edge of at least two sections, total length of the cutting edge being greater than that of the initial cutting edge, such that cutting force borne (loaded) per unit edge length is reduced, and the heat produced when cutting is dispersed. A multi-segment cutting edge and a one-or-more-segment cutting edge can be combined with each other to produce a compound cutting effect, thus cutting the material in multiple segments, and thus playing a role of reducing the cutting force per unit edge length. The cutting area borne by each cutting edge is small, such that only a reduced cutting force is needed during cutting.

In one embodiment, the first cutting edge only partially participates in cutting on its first extending segment. A radial distance of the first extending segment from a longitudinal axis of the step drill bit is larger than that of a segment of the second cutting edge at the same axial position as the first extending segment from the longitudinal axis of the step drill bit. The second cutting edge only partially participates in cutting on its second extending segment, and a radial distance of the second extending segment from the longitudinal axis of the step drill bit is larger than that of a segment of the first cutting edge at the same axial position as the second extending segment from the longitudinal axis of the step drill bit.

In another embodiment, the first extending segment includes at least one first cutting edge cutting area, and the second extending segment includes at least one second cutting edge cutting area, and the first cutting edge cutting area and the second cutting edge cutting area are adjacent to each other in the axial direction or radial direction of the step drill bit such that, when the step drill bit is rotating around the longitudinal axis of the step drill bit, the effects of the first cutting edge and the second cutting edge are merged.

In some embodiment, the first extending segment at least includes two first cutting edge cutting areas that are spaced from one another, and the second extending segment at least includes one second cutting edge cutting area, and the one second cutting edge cutting area is located between the two first cutting edge cutting areas in the axial direction or radial direction of the step drill bit such that, when then step drill bit in rotating around the longitudinal axis of the step drill bit, the effects of the first cutting edge and the second cutting edge are merged.

In another embodiment, the at least two-segment first cutting edge and/or second cutting edge comprise a first cutting edge segment and a second cutting edge segment which are arranged successively against a feeding direction. The first cutting edge segment and the second cutting edge segment of the at least two-segment style first cutting edge are different from each other in the entering/auxiliary angle relative to the feeding direction, and/or the first cutting edge segment and the second cutting edge segment of the at least two-segment style second cutting edge are different from one another in the entering/auxiliary angle relative to the feeding direction.

In one embodiment, the first cutting edge and the second cutting edge merge by rotating around the longitudinal axis of the step drill bit, the first cutting edge segment and/or second cutting edge segment of the at least two-segment first cutting edge intersect with the first cutting edge segment and/or second cutting edge segment of the at least two-segment style second cutting edge, or one one-segment style cutting edge of the first cutting edge and the second cutting edge is connected with the first cutting edge segment and/or second cutting edge segment of the other at least two-segment style cutting edge.

In another embodiment, the first cutting edge segment of the at least two-segment style first cutting edge and the first cutting edge segment of the at least two-segment style second cutting edge are different from each other in the entering/auxiliary angle relative to the feeding direction. The second cutting edge segment of the at least two-segment style first cutting edge and the second cutting edge segment of the at least two-segment style second cutting edge are different from one another in the entering/auxiliary angle relative to the feeding direction. Separately, one one-segment style cutting edge of the first and second cutting edges and the first and/or second cutting edge segment of the other at least two-segment style cutting edge are different from each other in the entering/auxiliary angle with respect to the feed direction.

In some embodiment, a length of the first cutting edge segment of the at least two-segment style first cutting edge is smaller than that of the at least two-segment style second cutting edge. A radial distance from the first cutting edge segment of the at least two-segment style first cutting edge to the longitudinal axis of the step drill bit is larger than that from the first cutting edge segment of the at least two-segment style second cutting edge to the longitudinal axis of the step drill bit at the same axial position.

In one embodiment, at least one of the cutting edge segments of the at least two-segment style first cutting edge or second cutting edge can be formed by locally reducing material on the initial one-segment style cutting edge.

In one embodiment, each cutting edge segment of the at least two-segment style first cutting edge and/or second cutting edge is constructed as a straight line section or a curved line section.

In another embodiment, at least one of the horizontal edge segments adjacent to the first cutting edge is offset by a distance in the radial direction from at least one of the horizontal edge segments adjacent to the second cutting edge.

In one embodiment, all of the cutting edges formed by the same flute on different step sections are configured identical in structure, or at least two of the cutting edges formed by the same flute on different step sections are configured different in structure.

In another embodiment, the flute is configured as a straight flute or a spiral flute.

According to another aspect of the present invention, the operation is carried out according to a method for drilling a workpiece by using a step drill bit. In this embodiment, the step drill bit has a hole processing portion and at least two flutes extending along the hole processing portion, the hole processing portion comprising one or more step sections, each step section and the at least two flutes forming at least two cutting edges distributed in a circumferential direction of the step section, wherein, the at least two cutting edges on at least one of the step sections at least comprise a first cutting edge and a second cutting edge. This method includes the following steps: cutting a first material part on a workpiece using the first cutting edge, wherein the first material part extends over only part of the length of the first cutting edge; cutting a second material part on the workpiece using the second cutting edge, wherein the second material part extends over only part of the length of the second cutting edge.

In another embodiment, the first material part includes at least one first sub-material part, and the second material part includes at least one second sub-material part adjacent to the first sub-material part.

In some embodiment, the first material part at least includes two first sub-material parts that are spaced from one another, and the second material part at least includes one second sub-material part located between the two first sub-material parts.

In another embodiment, the step drill bit is a step drill bit according to the present invention.

A person skilled in the art will understand the advantages of corresponding embodiments and various additional embodiments by reading the following detailed description of the corresponding embodiments with reference to the drawings.

BRIEF DESCRIPTION OF THE DRAWINGS

Hereinafter, embodiments of the present invention will be described with reference to the accompanying drawings. The drawings do not necessarily show the embodiments to scale, rather, the drawings used for illustration are implemented in a schematic manner and/or in a slightly modified form. One may see the relevant prior art for the supplementary aspects of the teachings that can be directly identified from the drawings. It should be noted here that various modifications and variants in the form and details of the embodiments can be implemented without departing from the general concept of the present invention. Features of the present invention disclosed in the description and drawings can be essential to the modified solutions of the present invention either individually or in any combination. In addition, all combinations composed of at least two of the features disclosed in the description and/or drawings are included in the scope of the present invention. The general concept of the present invention is not limited to the exact form or details of the preferred embodiments shown and described below.

The drawings include figures as the following:

FIG. 13 is a schematic view showing an embodiment of the combined cutting of two multi-segment style cutting edges, wherein one cutting edge comprises two straight line sections, and the other cutting edge comprises a straight line section and a concave section, and where the cutting area of each cutting edge is indicated by hatching;

FIG. 14 is a schematic view showing an embodiment of the combined cutting of one-segment style cutting edge and a multi-segment style cutting edge, wherein the multi-segment cutting edge comprises a straight line section and a concave section, and where the cutting area of each cutting edge is indicated by hatching;

FIG. 15 is a schematic view showing an embodiment of the combined cutting of two multi-segment style cutting edges, wherein both cutting edges comprise a straight line section and a concave section, and where the cutting area of each cutting edge is indicated by hatching;

FIG. 16 is a schematic view showing an embodiment of the combined cutting of two multi-segment style cutting edges, wherein both cutting edges comprise a straight line section and a concave section, and where the cutting area of each cutting edge is indicated by hatching;

FIG. 17 is a schematic view showing an embodiment of the combined cutting of two multi-segment style cutting edges, wherein one cutting edge comprises a concave section and a convex section, and the other cutting edge comprises a straight line section and a concave section, and where the cutting area of each cutting edge is indicated by hatching;

FIG. 18 is a schematic view showing an embodiment of the combined cutting of a multi-segment style cutting edge and a one-segment style cutting edge, wherein the multi-segment cutting edge comprises a concave section and a convex section, and the one-segment cutting edge comprises a straight line section, and where the cutting area of each cutting edge is indicated by hatching;

FIG. 19 is a schematic view showing an embodiment of the combined cutting of two multi-segment cutting edges, wherein one cutting edge comprises a convex section and a straight line section, and the other cutting edge comprises a straight line section and a convex section, and where the cutting area of each cutting edge is indicated by hatching.

DETAILED DESCRIPTION OF PREFERRED EMBODIMENTS

Figure 1:
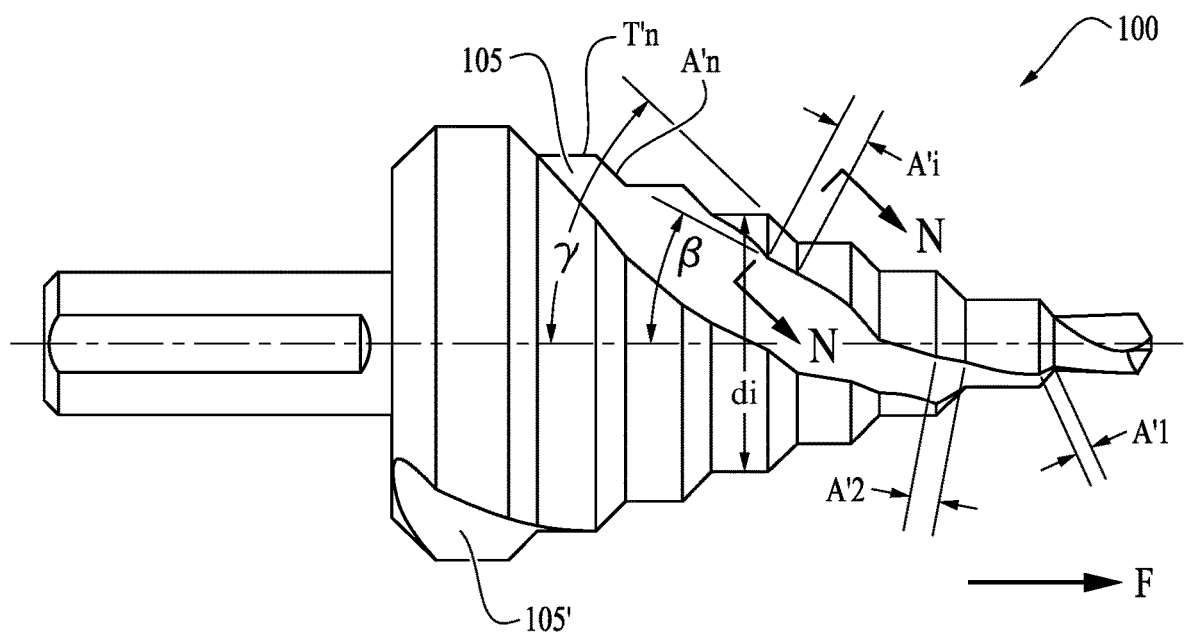
FIG. 1 is a schematic side view of a prior art step drill bit.
Figure 2:
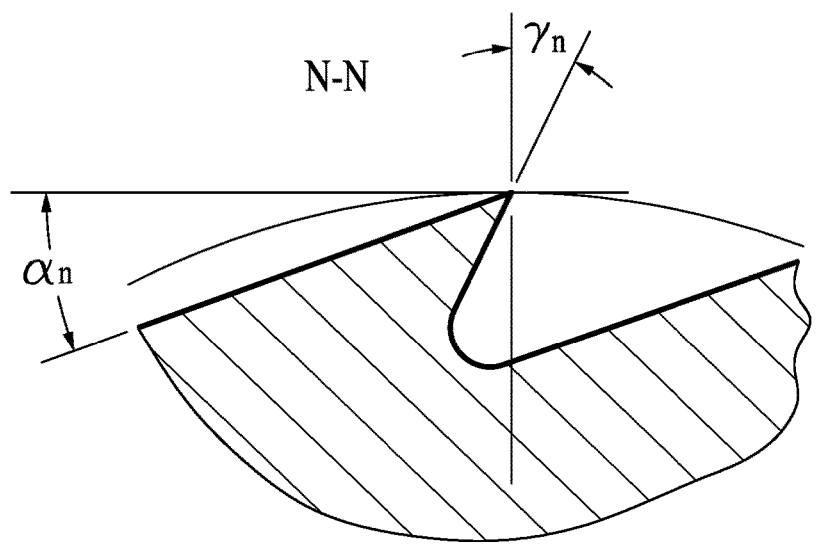
FIG. 2 is a schematic partial sectional enlarged view of the step drill bit shown in FIG. 1 through the section line N-N.

Exemplary embodiments of the step drill bit 1 with combined edges according to the present invention is described below. In this description, for the sake of explanation only, various systems, structures and devices are schematically depicted in the drawings, but all the features of actual systems, structures and devices are not described. For example, well-known functions or structures are not described in detail to avoid unnecessary details to obscure the present invention. Of course, it should be understood that in any practical application, many specific implementation decisions need to be made to achieve the specific goals of the developer or user, and the system-related and industry-related restrictions need to be observed. These specific goals may vary with actual applications. In addition, it should be understood that although such specific implementation decisions are complicated and time-consuming, this is a routine task for those of ordinary skill in the art who benefit from the present invention.

The terms and phrases used herein should be understood and interpreted as having a meaning consistent with the understanding of those terms and phrases by those skilled in the relevant art. The consistent usage of terms or phrases herein is not intended to imply a specific definition of the term or phrase, that is, a definition that differs from the ordinary and customary meanings understood by those skilled in the art. For terms or phrases intended to have a special meaning, that is, meanings different from those understood by the skilled person, this special definition will be clearly listed in the description by definition, giving special definition to the term or phrase directly and unambiguously.

Unless the content requires, throughout the following description, the words "comprising" and its variations, such as "including," will be interpreted in an open and inclusive sense, that is, as "including but not limited to."

Throughout the description of this description, recitation with reference to such a term as "an embodiment," "one embodiment," "some embodiments" "an example" "a specific example" or "some examples," etc., is intended to mean that a particular feature, structure, material, or characteristic described with reference to the embodiment(s) or example(s) is included in at least one embodiment or example of the present invention. Therefore, the phrases "in an embodiment" or "in one embodiment" appearing in various places throughout this description do not necessarily refer to a single embodiment. Further, specific features, structures, materials or characteristics described may be combined in any one or more embodiments or examples in a suitable manner.

Additionally, the terms "first," "second," and the like are used for descriptive purposes only and cannot be construed as indicating or implying relative importance or indicating implicitly the number of technical features. Thus, features defined as "first," "second," etc. may explicitly or implicitly include one or more of the features. In the description of the present invention, the meaning of "a plurality" is two or more, unless otherwise specified.

With reference to the schematic FIGS. 3-12, exemplary embodiments of the step drill bit 1 with combined edges (hereinafter called step drill bit 1) according to the present invention is described below.

Figure 3:
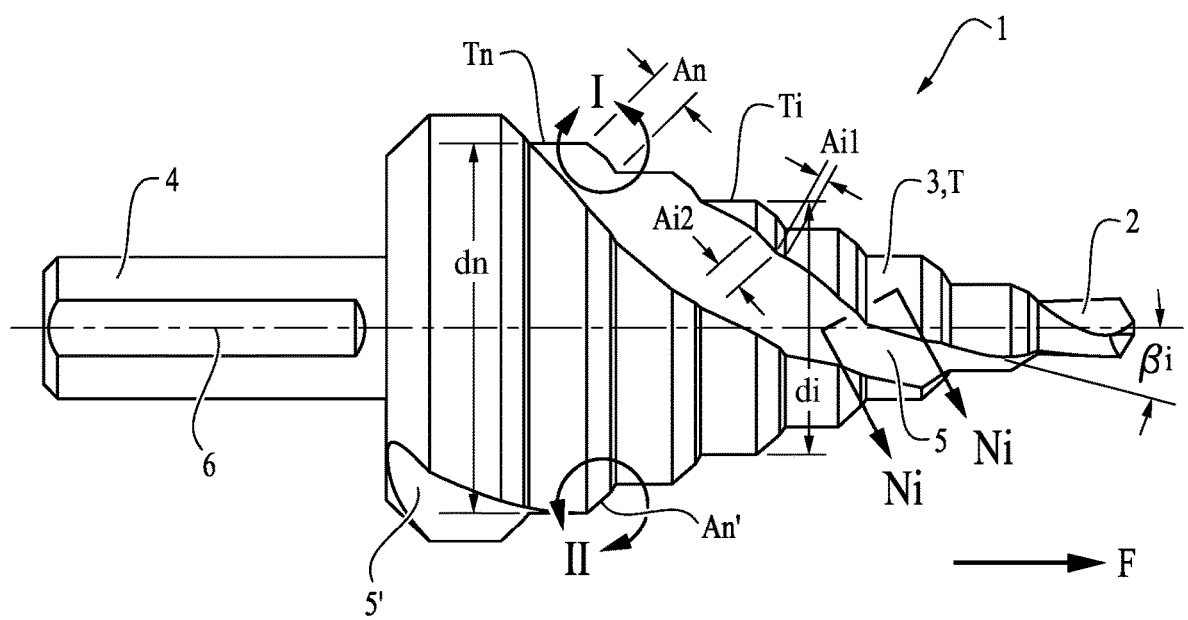
FIG. 3 is a schematic side view of a step drill bit with combined edges according to the present invention.

Referring to FIG. 3, the step drill bit 1 may comprise a drill tip 2 for drilling, an adjacent reaming portion 3 for reaming, and a shank portion 4. The drill tip 2 and the reaming portion 3 can together form a processing portion of the step drill bit 1 for drilling and reaming. The reaming portion 3 may include a plurality of step sections Tn (n=1, 2, 3, . . . , i, . . . ) which are adjacent to each other successively, and each step section Tn includes a truncated cone section and an adjacent cylindrical section. The step sections Tn can work as a group to carry out the step-by-step reaming function. Each step section Tn has a diameter that increases step by step from the drill tip 2 along the drilling direction F. In FIG. 3, a diameter do of n-th step section Tn (specifically, the cylindrical section thereof) behind in the drilling direction f and a diameter di of the i-th step section Ti (specifically, the cylindrical section thereof) ahead in the drilling direction f are given exemplarily, from which it can be seen that dn>di.

Here, the processing portion can be provided with two flutes 5, 5' which are chip-discharging flutes, namely, a first flute 5 having a substantial portion facing the outside of the plane of drawing page and a second flute 5' having a substantial portion facing the inside of the plane of the drawing page. The first flute 5 and the second flute 5' may extend spirally from one end to the other end of the processing portion, and may be radially symmetrical or rotationally symmetrical with each other about a longitudinal axis 6 of the step drill bit 1 in a circumferential direction. On each step section Tn, the first flute 5 may intersect with the truncated cone section of the step section Tn to form a first cutting edge An (depicted by a thick solid line in FIGS. 5 to 9), and the second flute 5' may intersect with the truncated cone section of the step section Tn to form a second cutting edge An' (depicted by a thick dotted line in FIGS. 5 to 9) that is spaced apart from the first cutting edge An by 180° in the circumferential direction. Therefore, two cutting edges An, An' can be respectively formed on each step section Tn. The two cutting edges An, An' can each have a cutting depth of f/2.

Optionally, three or more flutes 5, 5' may be provided on the processing portion, such that three or more cutting edges An, An' may be formed on each step section Tn, and these flutes 5, 5' may be evenly distributed in the circumferential direction and rotationally symmetrical about the longitudinal axis 6.

Optionally, each flute 5, 5' may be configured as a straight flute, i.e., extending straight linearly from one end of the processing portion to the other end, and thus forming cutting edges in the form of a straight line section.

Different from the prior art, each cutting edge An, An' on at least one step section Tn of the step drill bit 1 of the present invention may have a multi-segment or rather broken-line structure, that is, each cutting edge An, An' may include at least two cutting edge segments An1, An2, An1', An2' that are adjacent to each other in succession, and these cutting edge segments may together form the whole cutting edge An, An'.

Each cutting edge segment An1, An2, An1', An2' can be configured as a straight line section in the case of a straight line flute or a curved line section in the case of a curved line flute 5. However, it can also be formed as a straight line section by using a machining process according to specific functional requirements, especially because in the present invention, an inherently small cutting edge An, An' is designed to be composed of a plurality of smaller cutting edge segments An1, An2, An1', An2'. In the present invention, no matter whether it is a straight line flute or a curved line flute 5, each cutting edge segment An1, An2, An1', An2' can be reprocessed into a straight line section or an arc-shaped curved line section with different curvature radii according to specific requirements. That is, each cutting edge may be composed only of straight-line cutting edge segments, curved-line cutting edge segments, or a combination of straight-line cutting edge segments and curved-line cutting edge segments. Straight-line or curved-line cutting edge segments An1, An2, An1', An2' are all within the scope of protection of the present invention, and the concept of the present invention is also applicable to straight-line or curved-line cutting edges or cutting edges of any other shapes. For the sake of clarity, only simplified straight-line cutting edge segments An1, An2, An1', An2' will be described below.

As mentioned above, the adjacent cutting edge segments An1, An2, An1', An2' of each cutting edge An, An' may be angled to each other to form a section of a multi-segment line (i.e., multi-straight lines or multi-curved lines), or they may form an abrupt changing portion or a transition point at their adjoining position, or they may have slopes different from one another.

In this embodiment, the cutting edge segment of the straight-line section is taken as an example, that is, each cutting edge An, An' on each step section Tn can include a plurality of straight cutting edge segments An1, An2, An1', An2', which can jointly form a cutting edge An, An' in the form of a multi-segment line. In this embodiment, the number of cutting edge segments An1, An2, An1', An2' of each cutting edge An, An' on each step section Tn can be two, namely, the first cutting edge segment An1, An1' ahead and the second cutting edge segment An2, An2' behind in the feed direction F.

Referring to FIG. 3, for the i-th step section Ti, the first cutting edge Ai thereon may include a first cutting edge segment Ai1 and a second cutting edge segment Ai2 thereafter, which may be different from each other in length and may be at an angle to each other. An edge inclination angle (spiral angle) $\beta i$ can be seen in FIG. 3

Figure 4:
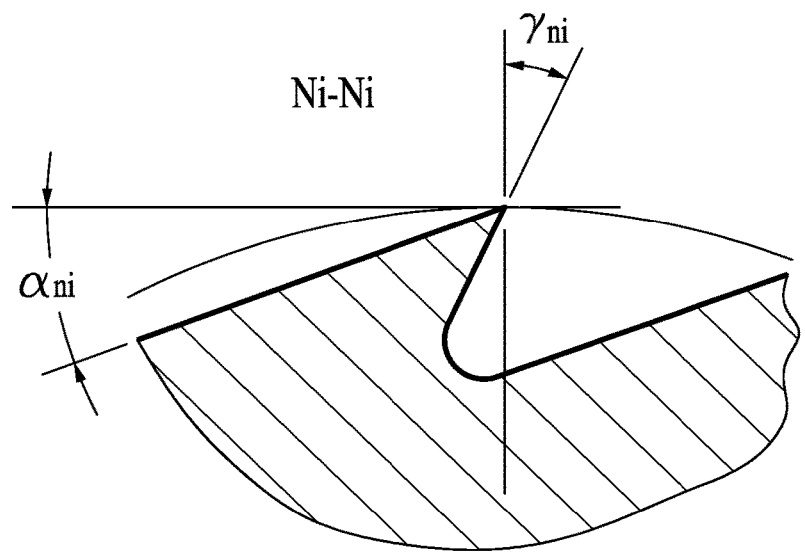
FIG. 4 is a schematic partial sectional enlarged view of the step drill bit with combined edges shown in FIG. 3 through the sectional line Ni-Ni.

FIG. 4 shows a partial enlarged view of the first cutting edge on a step section in FIG. 3 at a point of the cutting edge (specifically, the cutting edge of the first cutting edge segment) sectioned by the section line Ni-Ni, where $\gamma ni$ is the normal rake angle and $\alpha ni$ is the normal relief angle. The cutting angle and force borne at each point of the cutting edge are also different, which can be used to analyze the cutting principle of a cutter.

Structures of the first cutting edge An and the second cutting edge An' on the n-th step section Tn and a combined cutting manner thereof will be described below with reference to FIGS. 5 to 9.

Figure 5:
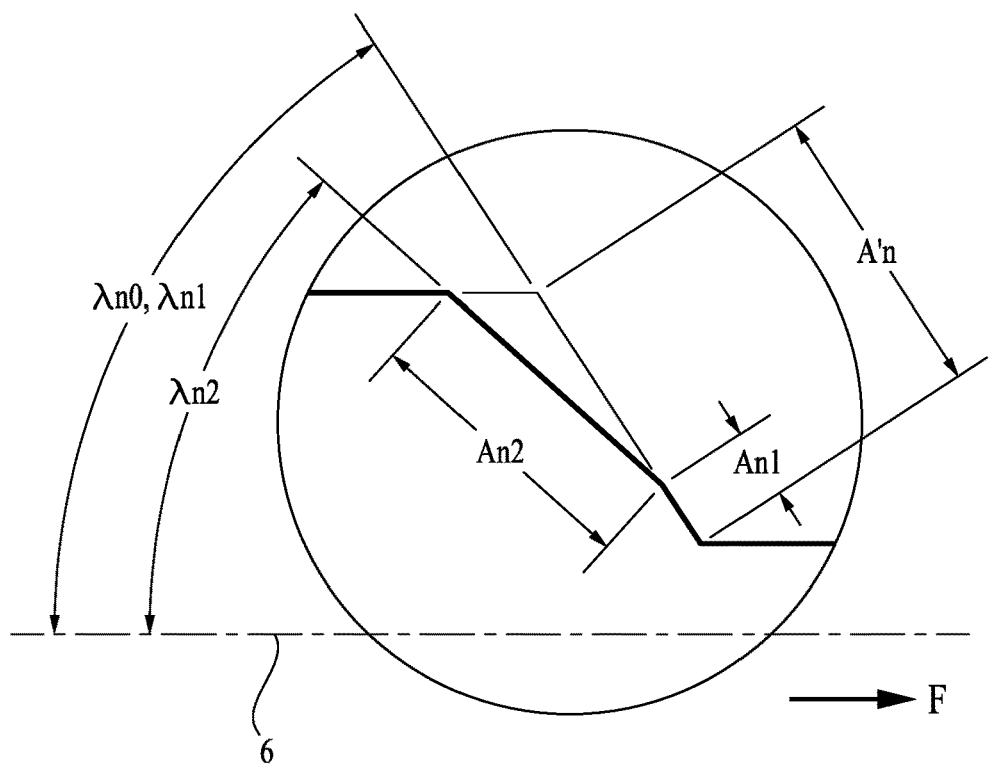
FIG. 5 is a schematic enlarged view of part I of the step drill bit with combined edges shown in FIG. 3.

Referring to FIG. 5, the first cutting edge An on the n-th step section Tn is shown in a thick solid line, which may include a first cutting edge segment An1 ahead in the feed direction F and a second cutting edge segment An2 behind in the feeding direction F. Lengths of the first cutting edge segment An1 and the second cutting edge segment An2 may be different from each other, and specifically, the former is smaller than the latter, and they may form an angle with each other, here an obtuse angle is shown, such that they can form collectively a multi-section line edge of a two-segment style.

The second cutting edge segment An2 can be formed by reducing the material, such as cutting off the material, at an upper portion of the initial one-segment style cutting edge A'n, while the first cutting edge segment An1 can then be formed by the cutting edge portion left after cutting off part of the material. Whereby, the entering angle $\lambda n1$ of the first cutting edge An at the first cutting edge segment An1 is unchanged compared with the entering angle $\lambda n0$ of the one-segment style cutting edge A'n, while the auxiliary angle)$\lambda n2$ of the first cutting edge An at the second cutting edge segment An2 is reduced compared with $\lambda n0$ or $\lambda n1$, that is, $\lambda n2<\lambda n1=\lambda no$.

Besides, as can be seen from FIG. 5, the length An1 of the first cutting edge segment An1 and the length An2 of the second cutting edge segment An2 of the first cutting edge An are both smaller than the length A'n of the initial one-segment style first cutting edge A'n, but the sum of the two is obviously larger than the length A'n of the initial one-segment style first cutting edge A'n, that is, $An1<An2<A'n$, and $An1+An2>A'n$.

Figure 6:
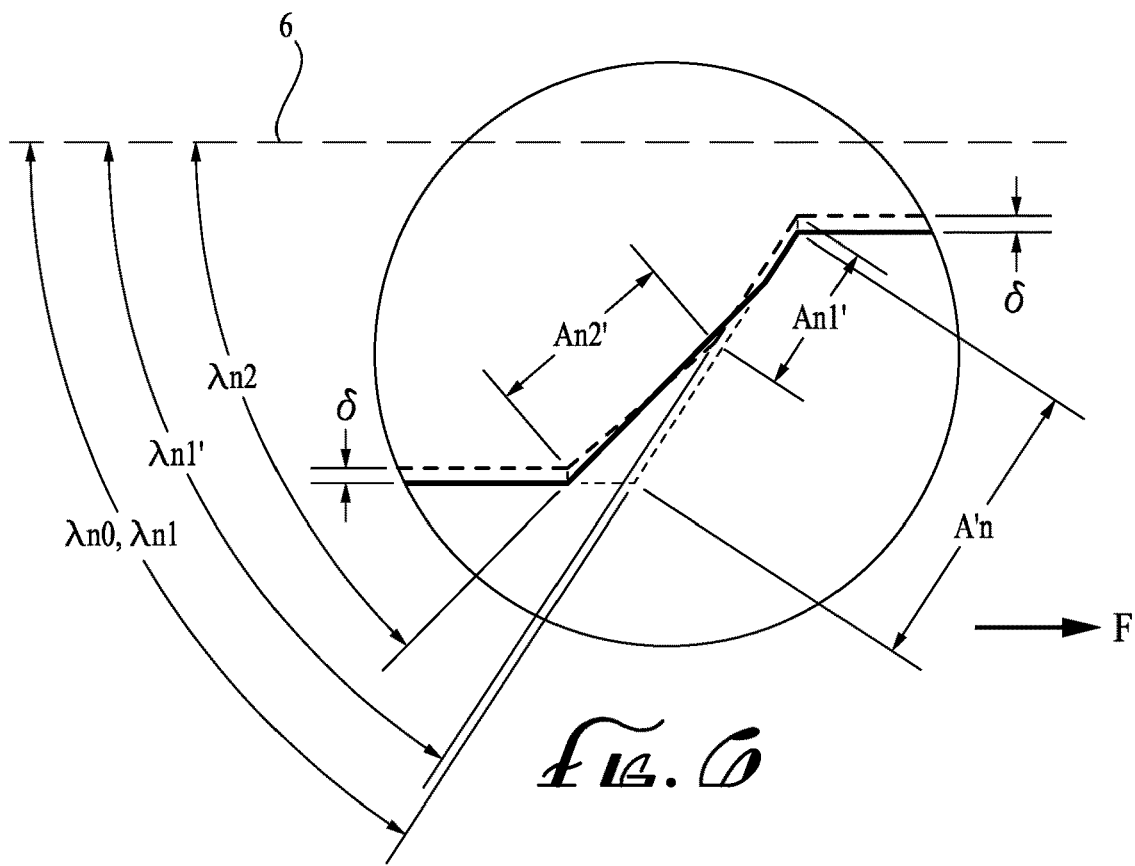
FIG. 6 is a schematic enlarged view of part II of the step drill bit with combined edges shown in FIG. 3, wherein the first cutting edge in FIG. 5 is merged with the second cutting edge after rotating 180° around the longitudinal axis of the step drill bit.

Referring to FIG. 6, a combined comparison is made between the first cutting edge An depicted by the thick solid line after rotating 180 degrees around the longitudinal axis 6 of the step drill bit and the second cutting edge An' depicted by the thick dotted line as shown in FIG. 5. The second cutting edge An' may include a first cutting edge segment An1' ahead in the feeding direction F and a second cutting edge segment An2' behind in the feeding direction F. Lengths of the first cutting edge segment An1' and the second cutting edge segment An2' of the second cutting edge An' may be different from each other, and specifically, the former is smaller than the latter, and they may form an angle with each other, here an obtuse angle is shown, such that they can form collectively a two-segment style multi-segment line edge An'. The length An1' of the first cutting edge segment An1' and the length An2' of the second cutting edge segment An2' of the second cutting edge An' are both smaller than the length A'n of the initial one-segment style first cutting edge A'n, but the sum of the two is obviously larger than the length A'n of the initial one-segment style first cutting edge A'n, that is, $An1'<An2'<A'n$, and $An1'+An2'>A'n$.

Figure 7:
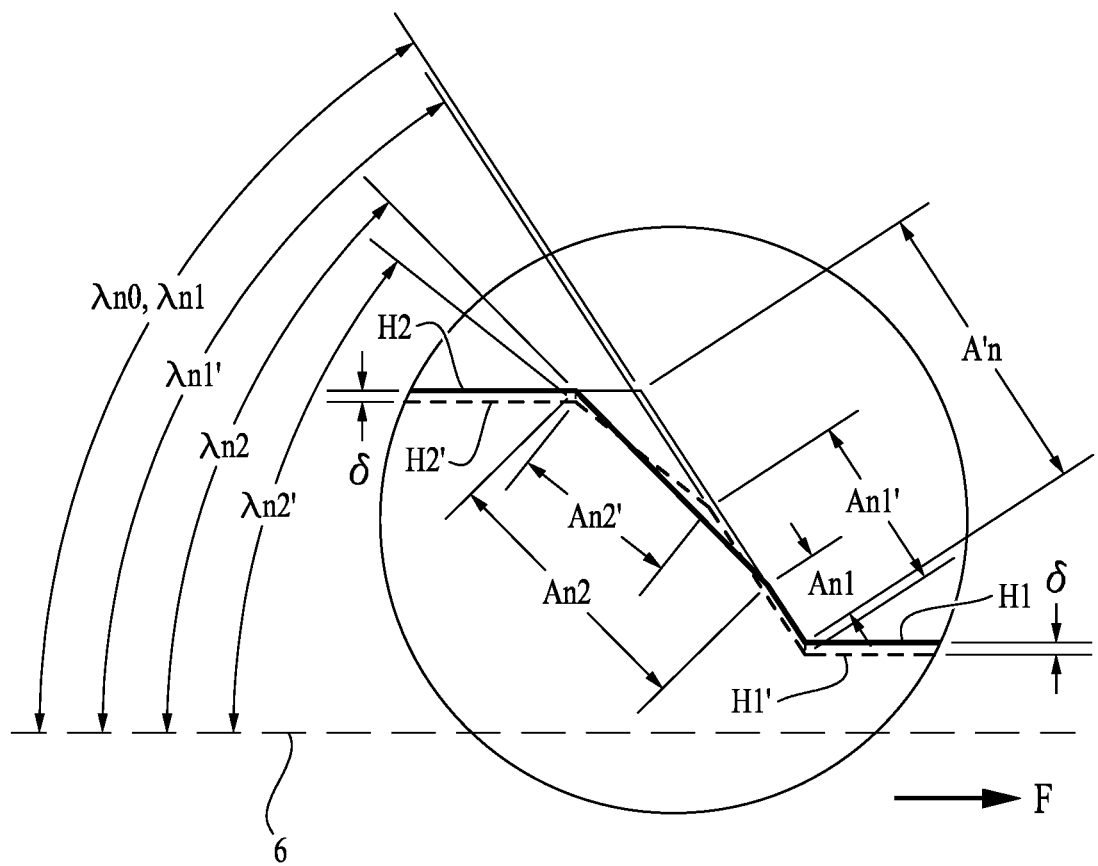
FIG. 7 is a schematic view showing the second cutting edge at the part II of the step drill bit with combined edges as shown in FIG. 3 merged with the first cutting edge at the part I after rotating 180° around the longitudinal axis of the step drill bit.

Referring to FIG. 7, a combined comparison is made between the second cutting edge An' depicted by the thick solid line after rotating 180 degrees around the longitudinal axis 6 of the step drill bit and the first cutting edge An depicted by the thick dotted line as shown in FIG. 5.

Referring to FIG. 6 and FIG. 7, by making a combined comparison between the two cutting edges An, An', one can better see different structures of them and how they can be used in combination to form "combined edges" for combined cutting.

Referring to FIG. 7, the first horizontal edge section H1 ahead in the feeding direction F adjoining the first cutting edge segment An1 of the first cutting edge An may be parallel to the first horizontal edge section ahead H1' in the feeding direction F adjoining the first cutting edge segment An1' of the second cutting edge An', and the former may be further away from the longitudinal axis 6 than the latter by a distance $\delta$. The first cutting edge segment An1 of the first cutting edge An may be parallel to the first cutting edge segment An1' of the second cutting edge An', and at the same axial position, the former may be further away from the longitudinal axis 6 than the latter by a distance $\delta$. The length An1 of the first cutting edge segment An1 of the first cutting edge An may be smaller than the first cutting edge segment An1' of the second cutting edge An', that is, $An1<An1'$. As so, the first cutting edge segment An1' of the second cutting edge An' may intersect with the second cutting edge segment An2 of the first cutting edge An.

The entering angle $\lambda n1$ of the first cutting edge segment An1 of the first cutting edge An is equal to the entering angle $\lambda n1'$ of the first cutting edge segment An1' of the second cutting edge An', and is equal to the entering angle $\lambda n0$ of the initial one-segment style first cutting edge A'n, that is, $\lambda n1=\lambda n1'=\lambda n0$.

The second horizontal edge section H2 behind in the feeding direction F adjoining the second cutting edge segment An2 of the first cutting edge An may be parallel to the second horizontal edge section H2' behind in the feeding direction F adjoining the second cutting edge segment An2' of the second cutting edge An', and the former may be further away from the longitudinal axis 6 than the latter by a distance $\delta$. The second cutting edge segment An1' of the second cutting edge An' may intersect with the second cutting edge segment An2 of the first cutting edge An.

The entering angle $\lambda n2$ of the second cutting edge segment An2 of the first cutting edge An is larger than the entering angle $\lambda n2'$ of the second cutting edge segment An2' of the second cutting edge An'. Both of these are smaller than the entering angle $\lambda n1$ of the first cutting edge segment An1 of the first cutting edge An or the entering angle $\lambda n1'$ of the first cutting edge segment An1' of the second cutting edge An' or the entering angle λn0 of the initial one-segment style first cutting edge A'n, that is, λn2'<λn2<λn1=λn1'=λn0.

Figure 8:
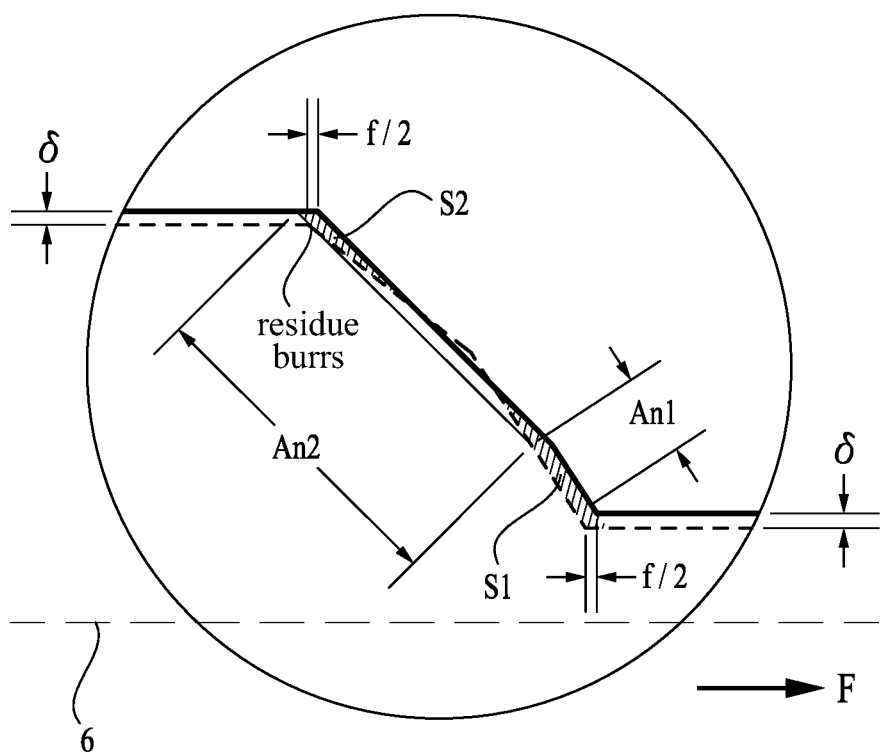
FIG. 8 is a schematic diagram of a portion of the drill bit of FIG. 7, in which two first extending segments of the first cutting edge are shown by hatching.

As so, referring to FIG. 8, the first cutting edge An may partially radially extend outward beyond the second cutting edge An' with its first extension sections S1, S2 (compared at the same axial position), which may be two planar sections S1, S2 separated from each other. The two first extension sections S1, S2 of the first cutting edge An are shown by hatching, and they form two first cutting edge cutting areas S1, S2, which are spaced apart from each other. A feed rate during drilling is f=mm/rpm (mm/revolution). A cutting depth of the first extension sections S1, S2 is maximum f/2. Cutting areas S1, S2 of the first cutting edge may only extend over part of the length of the first cutting edge An. The cutting areas S1, S2 of the first cutting edge may correspond to cross-sectional area of the material or chips cut by the first cutting edge An in each revolution.

Here, cutting of the first cutting edge An is based on the cutting of the second cutting edge An', and the two first cutting edge cutting areas S1 and S2 of the first cutting edge An form two cutting areas S1 and S2 with different shapes, so that a total area S cut by the first cutting edge An may be: S=S1+S2. The two cutting areas S1 and S2 can be separated from each other, so that they can produce a strict chip-shunting effect when the first cutting edge An cuts. Besides, the residual burr (not shown) left after cutting process by the second cutting edge An', can also be cut off by the first cutting edge An, and then a total area S cut by the first cutting edge An can be: S=S1+S2+residual burr area.

Figure 9:
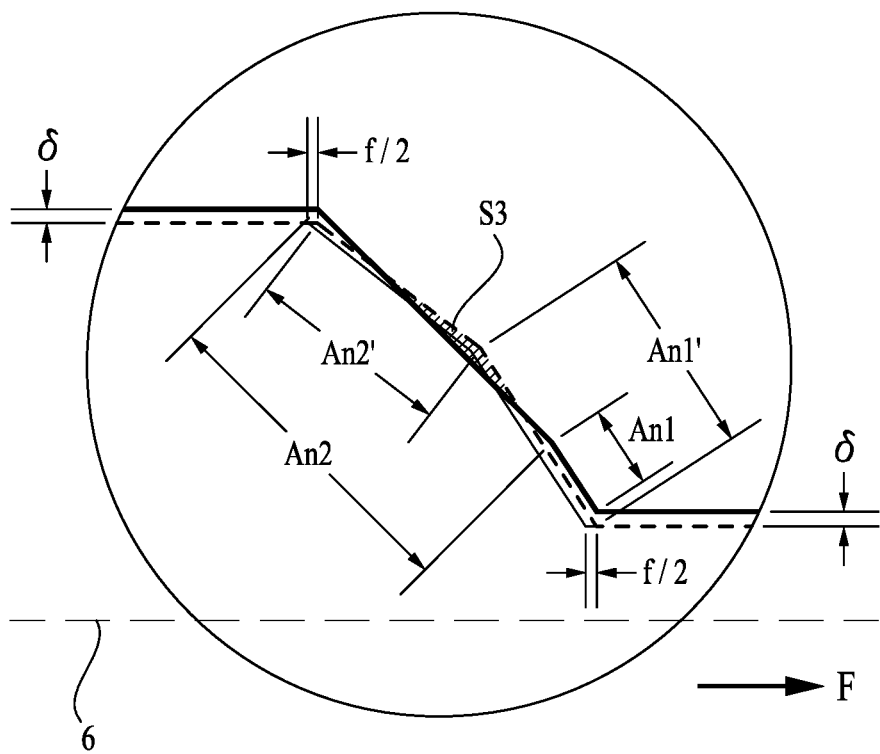
FIG. 9 is a schematic diagram of a portion of the drill bit of FIG. 7, in which one second extending segment of the second cutting edge are shown by hatching.

Referring to FIG. 9, the second cutting edge An' may partially radially extend outward beyond the first cutting edge An with its second extension section S3 (compared at the same axial position), which may here be one planar triangular section S3. The second extension section S3 of the second cutting edge An' is shown by hatching, which forms the second cutting edge cutting area S3. A feed rate during drilling is f=mm/rpm (mm/revolution). A cutting depth of the second extension section S3 is maximum f/2. The second cutting edge cutting area S3 may only extend over part of the length of the second cutting edge An'. The second cutting edge cutting area S3 may correspond to cross-sectional area of the material or chips cut by the second cutting edge An' in each revolution.

Here, cutting of the second cutting edge An' is based on the cutting of the first cutting edge An, and the second cutting edge cutting area S3 of the second cutting edge An form a single cutting area S3, so that a total area S' cut by the first cutting edge An may be: S'=S3. The second cutting edge An' cannot produce a chip-shunting effect when it is cutting. Here, S>S'.

Size and number of cutting regions or cutting areas S1, S2, S3 of the first cutting edge An and the second cutting edge An' are not limited to this embodiment, but can be changed with changes of the respective structures of the two cutting edges An, An' or parameters of the tool. Generally speaking, the first cutting edge An may have at least one cutting region or cutting area, while the second cutting edge An' can have at least one cutting region or cutting area, and they can participate in cutting materials of different portions on a workpiece, such as a plate, and therefore can be combined with each other to complete material cutting-off of a workpiece. Therefore, in the present invention it is called "combined edges."

Figure 10:
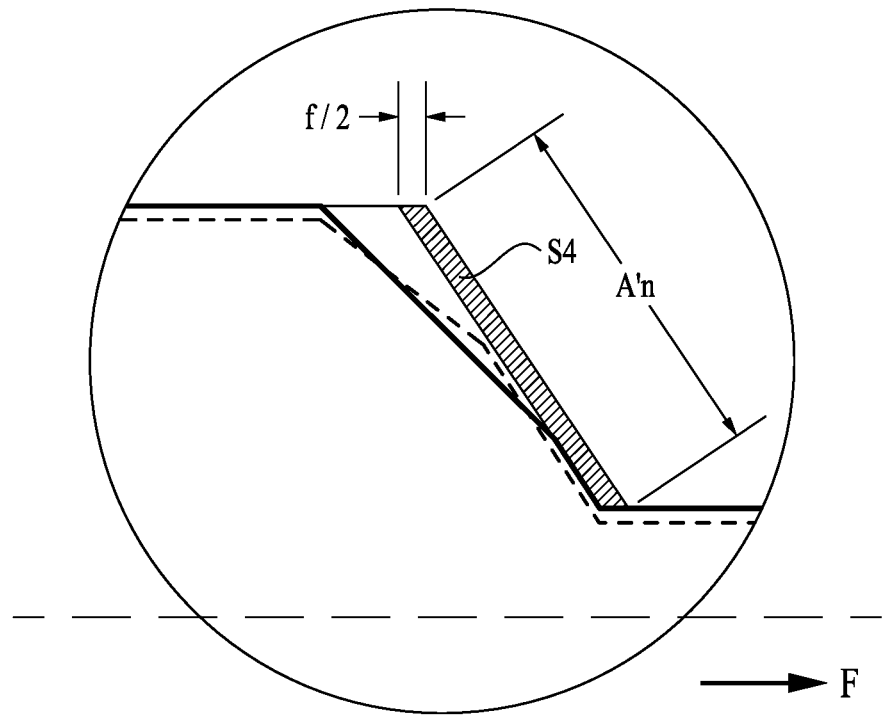
FIG. 10 is a schematic view showing the cutting of two cutting edges or teeth of a prior art step drill bit, wherein the cutting area of each cutting edge is indicated by hatching.

As for a common prior art step drill bit 101, as shown in FIG. 10, its two cutting edges A'n and A'n' are each of one-segment style and cut on the whole cutting edge length A'n and A'n', and the cutting area S4 of each cutting edge per revolution is the same. Therefore, it cannot produce the effect of chip shunting all the time, and has a large cutting force.

To sum up, in this embodiment, each cutting edge An, An' can be divided into two cutting edge segments An1, An2 and An1', An2'. As such, the initial two one-line cutting edges become two groups of two-line cutting edges. The primary or auxiliary angle λ of the cutting edge has a significant change. At the same time, the spiral angle βi (that is, the edge inclination angle) of each segment may also have some change. The total length of the cutting edge divided into a plurality of cutting edge segments An1, An2 or An1', An2' is larger than the length of the initial cutting edge An, An', which reduces the cutting force borne (loaded) on the unit edge length and has a very good effect in chip shunting, thus dispersing the cutting heat.

Structure of the cutting edge on the n-th step section Tn of the step drill bit 1 in this embodiment has been described above. In this embodiment, both the first cutting edge An and the second cutting edge An' can be provided in a multi-segment style structure. The step sections other than the n-th step section Tn, for example, the tooth profile or structure of its first cutting edge may be the same as that of the first cutting edge An on the n-th step section Tn, and the tooth profile or structure of its second cutting edge may be the same as that of the second cutting edge An' on the n-th step section Tn.

Figure 11:
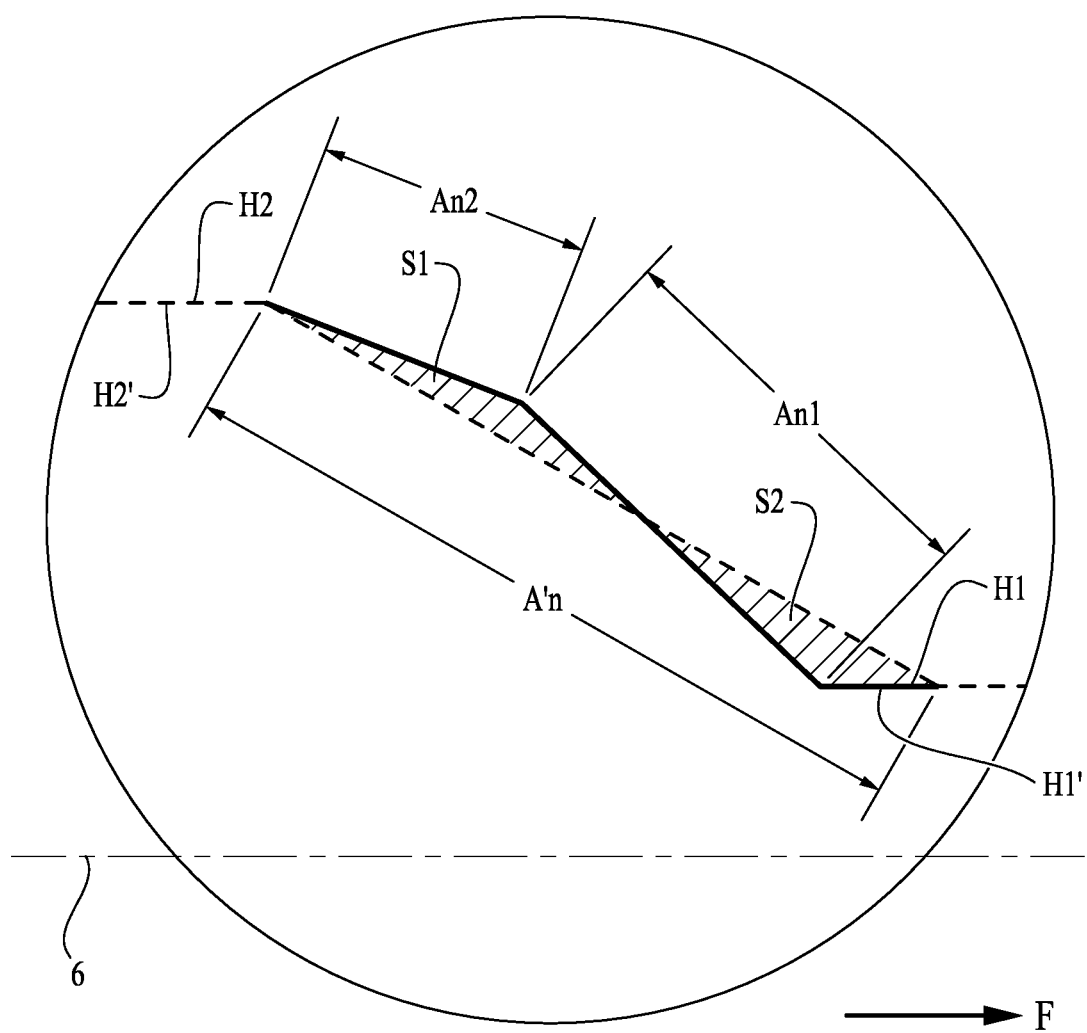
FIG. 11 is a schematic view showing an embodiment of the combined cutting of a one-segment style cutting edge and a multi-segment style cutting edge on a step section, wherein one cutting area of each cutting edge is indicated by hatching.
Figure 12:
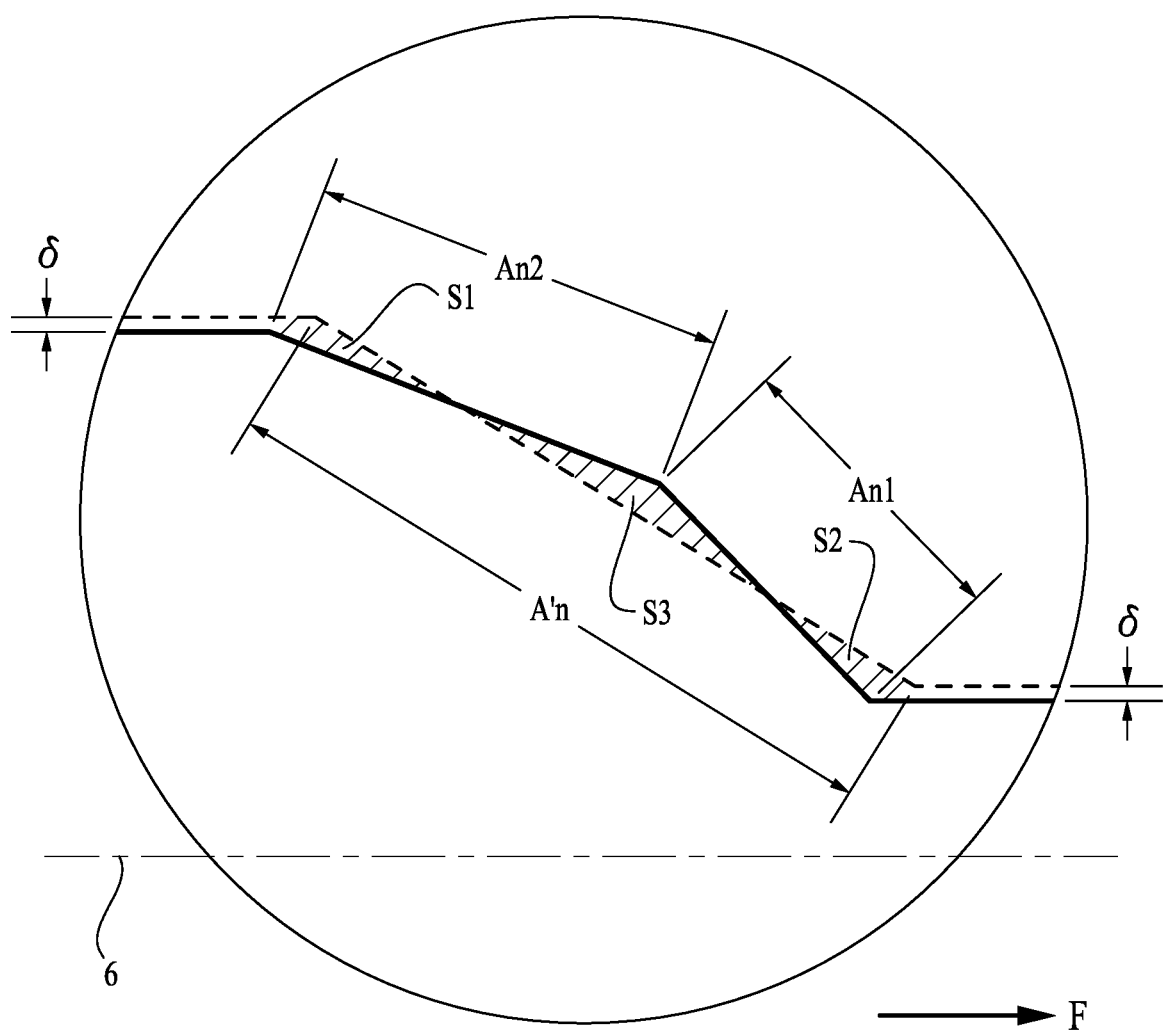
FIG. 12 is a schematic view showing another embodiment of the combined cutting of a one-segment style cutting edge and a multi-segment style cutting edge on a step section, wherein one and two cutting areas of each cutting edge are indicated by hatching.

In other embodiments, referring to FIGS. 11 and 12, for the n-th step section Tn, only one cutting edge of the two cutting edges can be arranged to a multi-segment structure Meanwhile the other cutting edge A'n is still arranged to a one-segment style structure, which can still be combined to cut in various possible specific structures, and can also form respective extension sections S1, S2, S3 or cutting edge cutting areas S1, S1, S3 like the combination of two multi-segment style cutting edges.

In FIG. 11, horizontal edge sections H1, H1', H2, H2' on the same side adjoining the two cutting edges may have the same radial dimension, so that they coincide with each other after rotation. The two cutting edges respectively form a triangular extension section S1, S2 or cutting edge cutting areas S1, S2, which are adjacent to each other in the radial direction or axial direction of the step drill bit (when the two cutting edges are effectively merged by rotating) and can be cut in combination with each other.

In FIG. 12, radial dimensions of the horizontal edge sections H1, H1', H2, H2' on the same side adjoining the two cutting edges may differ by a distance δ. One of the cutting edges forms two extension sections S1, S2 or cutting edge cutting areas S1, S2 spaced apart from each other in the radial or axial direction of the step drill bit, while the other cutting edge thereof forms one extension section S3 or cutting edge cutting area S3 located between the two extension sections S1, S2. A strict chip shunting effect can be produced here during cutting.

FIGS. 13 to 19 schematically show other embodiments of cutting edge combinations on the n-th step section Tn of the step drill bit 1, respectively. In various embodiments, some cutting edge segments are formed as sections of straight lines and other cutting edge segments are formed as sections of curved lines, and these straight lines or curved lines on different cutting edges perform combined cutting. Sections of straight lines and curved lines can be obtained by suitable machining methods.

Figure 13:
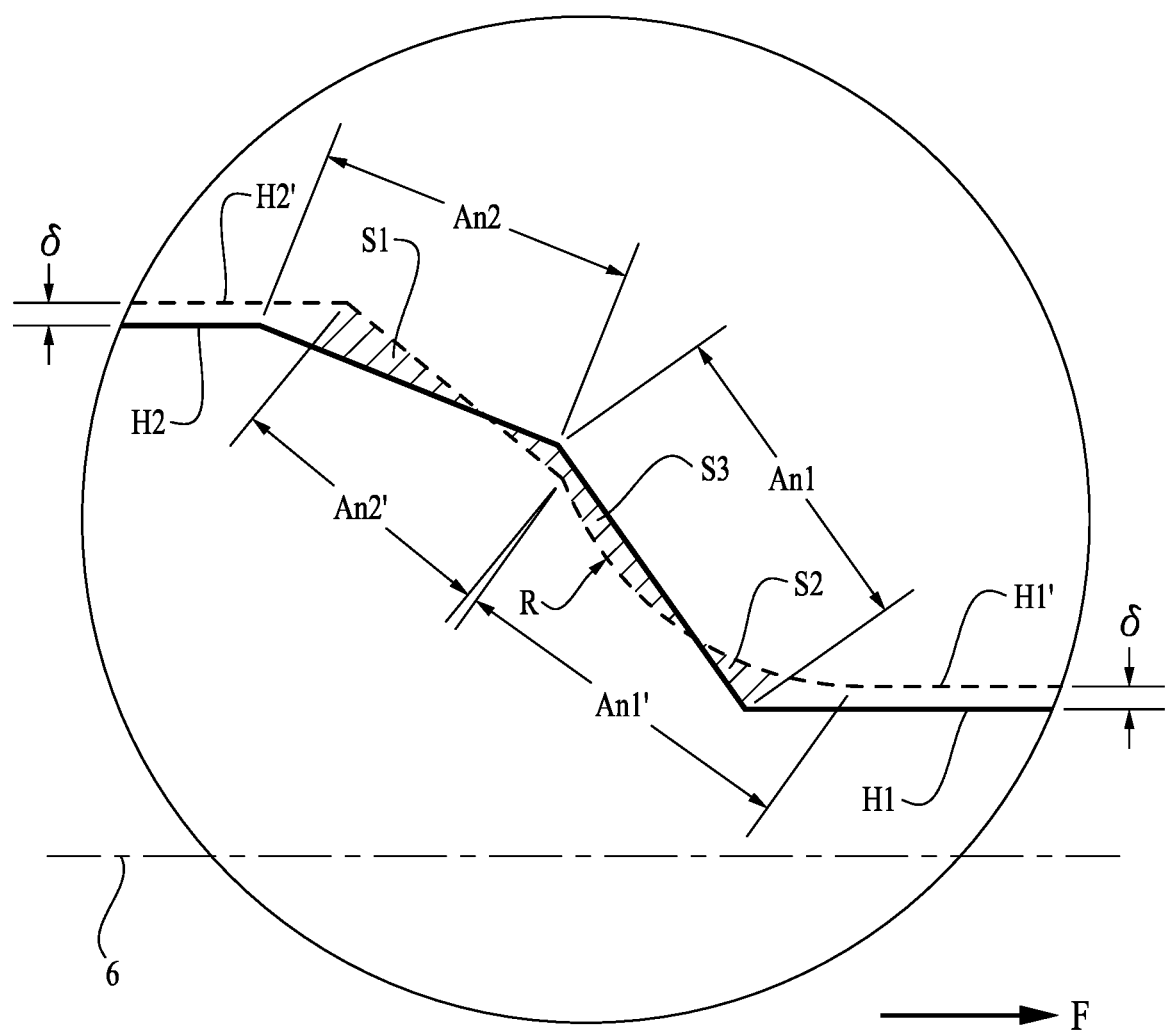
FIGS. 13 to 19 schematically show other embodiments of cutting edge combination on the n-th step section Tn of the step drill bit, respectively.

In FIG. 13, radial dimensions of the horizontal edge sections H1, H1', H2, H2' on the same side adjoining the two cutting edges An, An' may differ by a distance δ. The two cutting edge segments An1, An2 of the first cutting edge An are straight line sections, while the first cutting edge segment An1' of the second cutting edge An' is a concave curved line section with a diameter R, and the second cutting edge segment An2' of the second cutting edge An' is a straight line section. The second cutting edge An' has two extension sections S1, S2 or cutting edge cutting areas S1, S2 spaced apart from each other in the radial or axial direction of the step drill bit, while the first cutting edge An has one extension section S3 or cutting edge cutting area S3 located between the two extension sections S1, S2. A strict chip shunting effect can be produced here during cutting.

Figure 14:
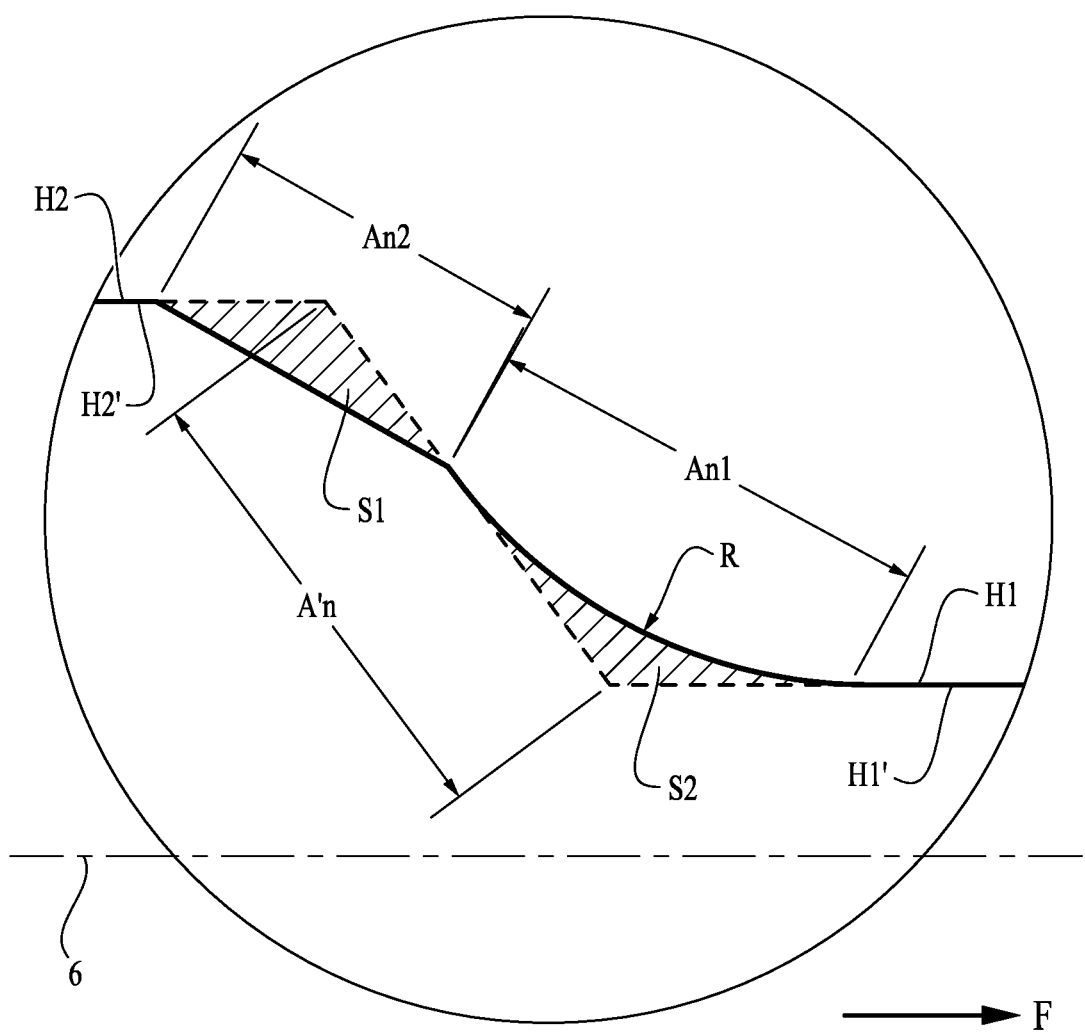

In FIG. 14, horizontal edge sections H1, H1', H2, H2' on the same side adjoining the two cutting edges An, A'n may have the same radial dimension, so that they coincide with each other after rotation. The first cutting edge segment An1 of the first cutting edge An is a concave curved line section with a diameter R, and the second cutting edge segment An2 of the first cutting edge An is a straight line section, while the second cutting edge segment A'n is of one-segment style and is a straight line section. Each cutting edge has an extension section S1, S2 or cutting edge cutting area S1, S2 which are adjacent to each other.

Figure 15:
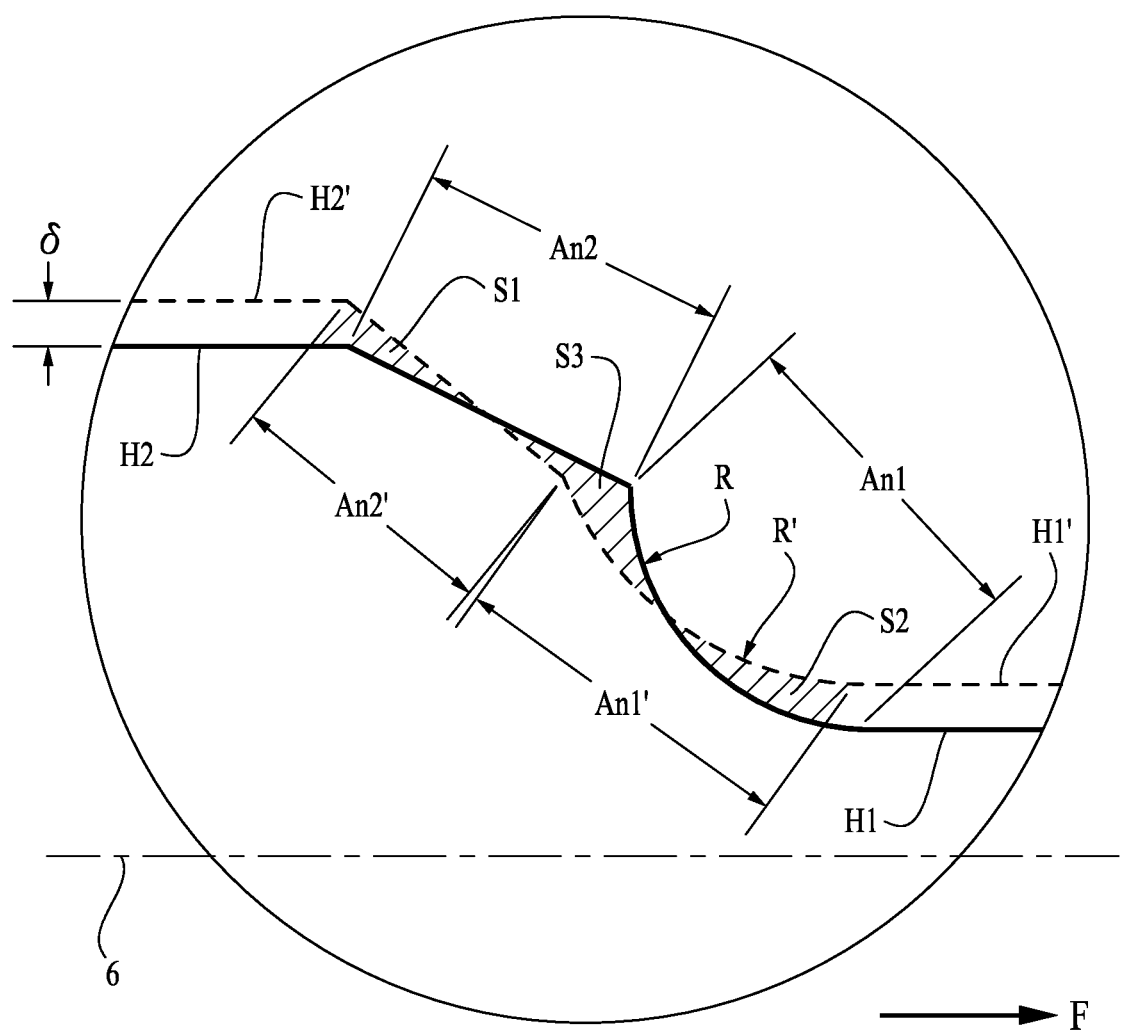

In FIG. 15, radial dimensions of the horizontal edge sections H1, H1', H2, H2' on the same side adjoining the two cutting edges An, An' may differ by a distance δ. The first cutting edge segments An1 of the first cutting edge An is a concave curved line section with a curvature radius R, while the first cutting edge segment An1' of the second cutting edge An' is a concave curved line section with a curvature radius R', wherein R and R' may be the same or different; and the second cutting edge segments An2, An2' of the first An or second An' cutting edge are straight line sections. The second cutting edge An' has two extension sections S1, S2 or cutting edge cutting areas S1, S2 spaced apart from each other in the radial or axial direction of the step drill bit, while the first cutting edge An has one extension section S3 or cutting edge cutting area S3 located between the two extension sections S1, S2. A strict chip shunting effect can be produced here during cutting.

Figure 16:
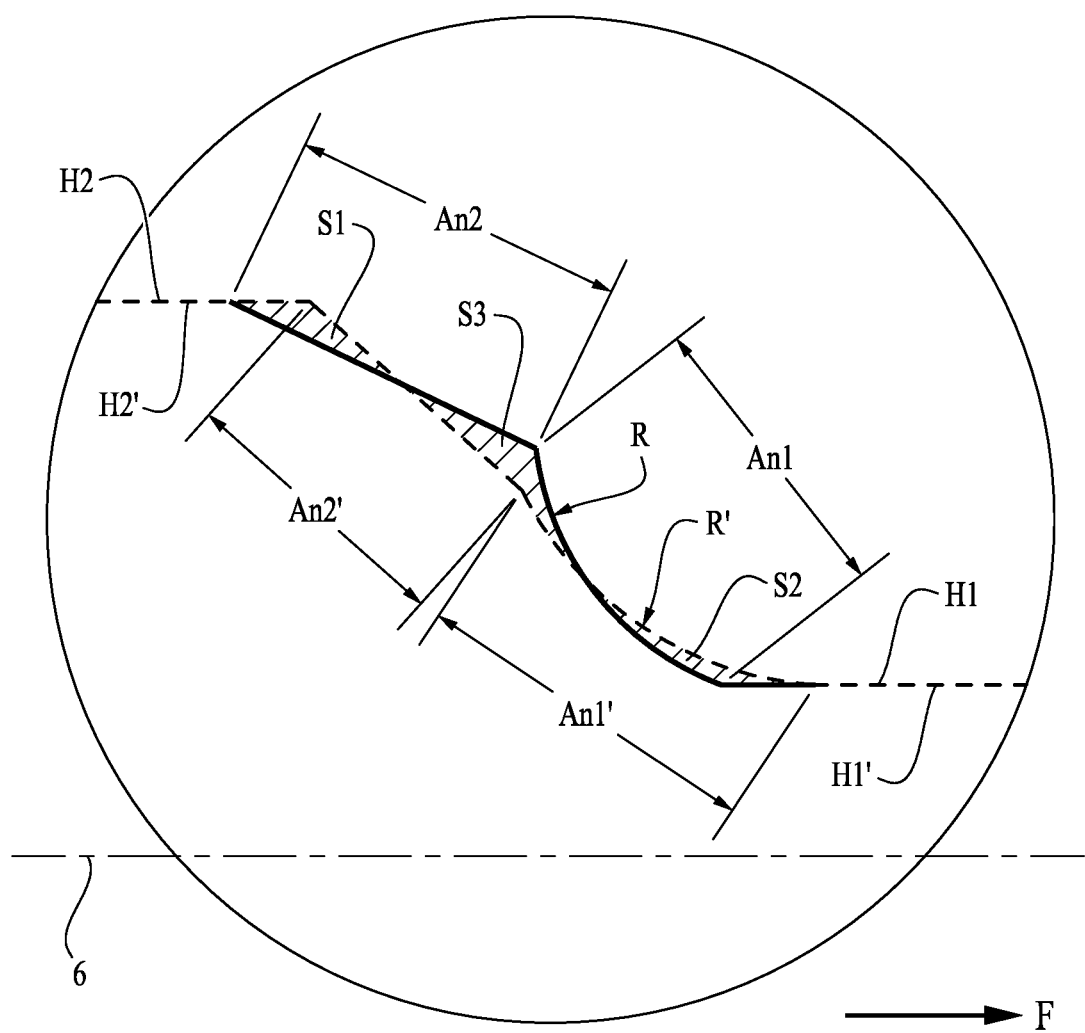

In FIG. 16, horizontal edge sections H1, H1', H2, H2' on the same side adjoining the two cutting edges An, A'n may have the same radial dimension, so that they coincide with each other after rotation. The first cutting edge segments An1 of the first cutting edge An is a concave curved line section with a curvature radius R, while the first cutting edge segment An1' of the second cutting edge An' is a concave curved line section with a curvature radius R', wherein R and R' may be the same or different; and the second cutting edge segments An2, An2' of the first An or second An' cutting edges are a straight line sections. The second cutting edge An' has two extension sections S1, S2 or cutting edge cutting areas S1, S2 spaced apart from each other in the radial or axial direction of the step drill bit, while the first cutting edge An has one extension section S3 or cutting edge cutting area S3 located between the two extension sections S1, S2. A strict chip shunting effect can be produced here during cutting.

Figure 17:
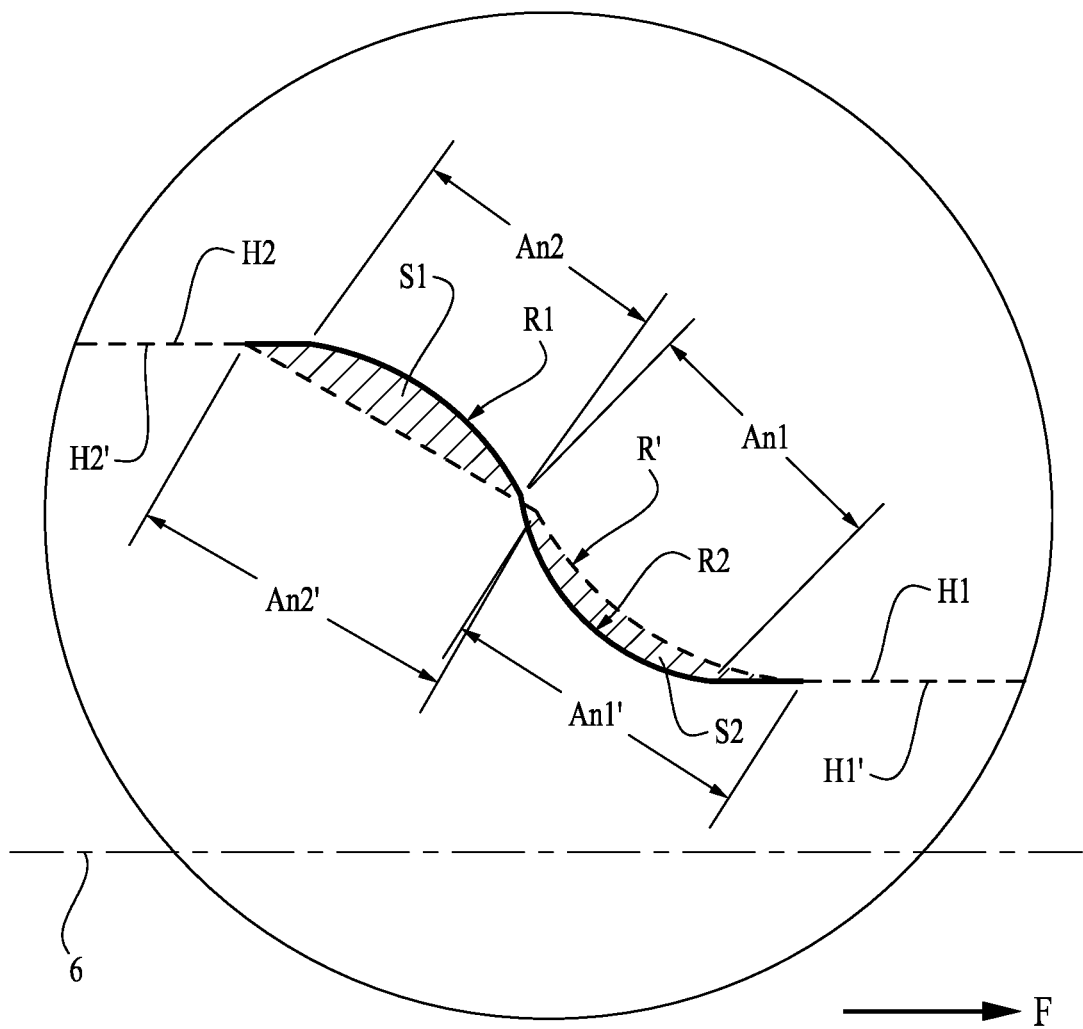

In FIG. 17, horizontal edge sections H1, H1', H2, H2' on the same side adjoining the two cutting edges An, A'n may have the same radial dimension, so that they coincide with each other after rotation. The first cutting edge segment An1 of the first cutting edge An is a concave curved line section with a curvature radius R2, while the first cutting edge segment An1' of the second cutting edge An' is a concave curved line section with a curvature radius R', wherein R2<R'; and the second cutting edge segment An2 of the first cutting edge An is a convex curved line section with a curvature radius R1, wherein R1=R2 (but not mandatory), and the second cutting edge segment An2' of the second cutting edge An' is a straight line section. Each cutting edge has an extension section S1, S2 or cutting edge cutting area S1, S2 which are adjacent to each other.

Figure 18:
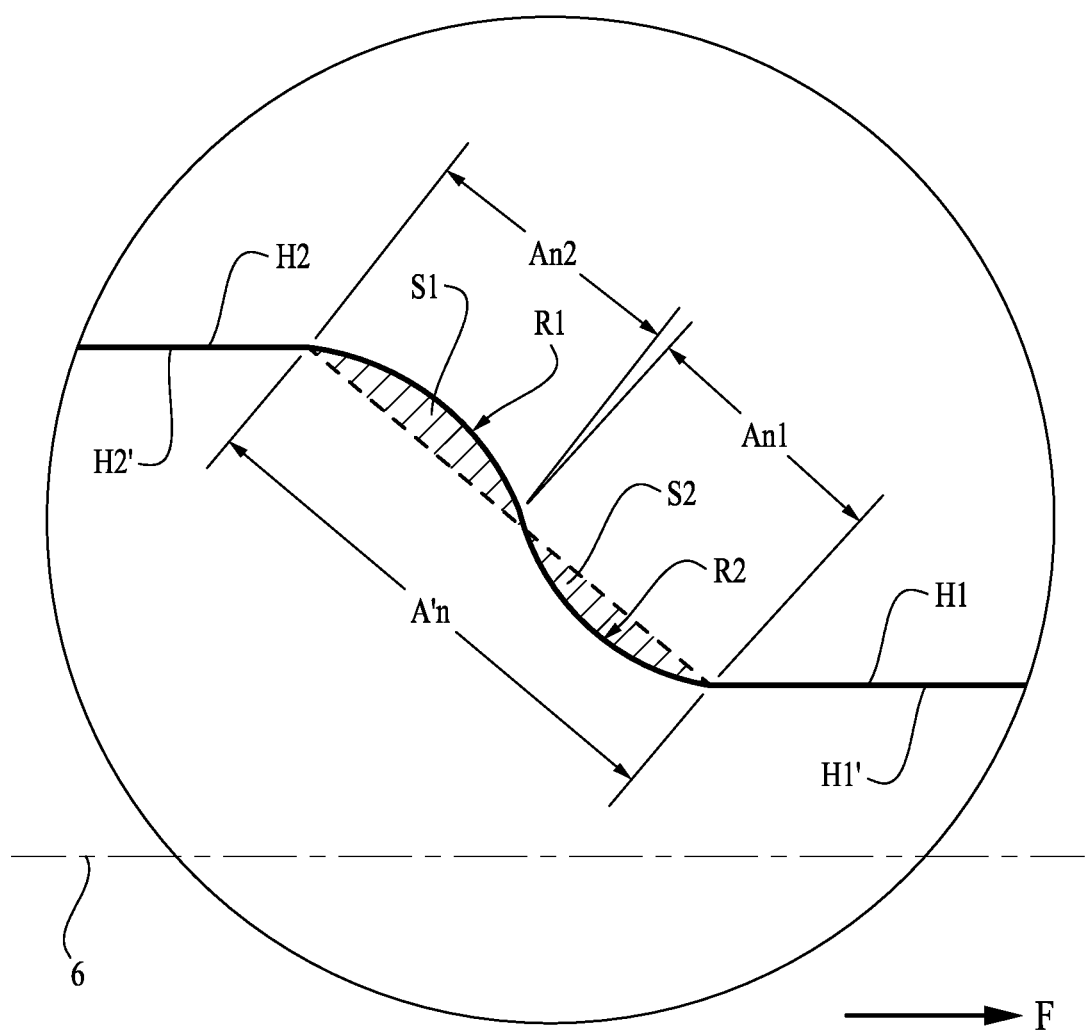

In FIG. 18, horizontal edge sections H1, H1', H2, H2' on the same side adjoining the two cutting edges An, A'n may have the same radial dimension, so that they coincide with each other after rotation. The first cutting edge segment An1 of the first cutting edge An is a concave curved line section with a curvature diameter R2, while the second cutting edge segment An2 of the first cutting edge An is a convex curved line section with a curvature radius R1, wherein R1=R2 (but not mandatory); and the second cutting edge segment A'n is of one-segment style and is a straight line section. Each cutting edge has an extension section S1, S2 or cutting edge cutting area S1, S2 which are adjacent to each other.

Figure 19:
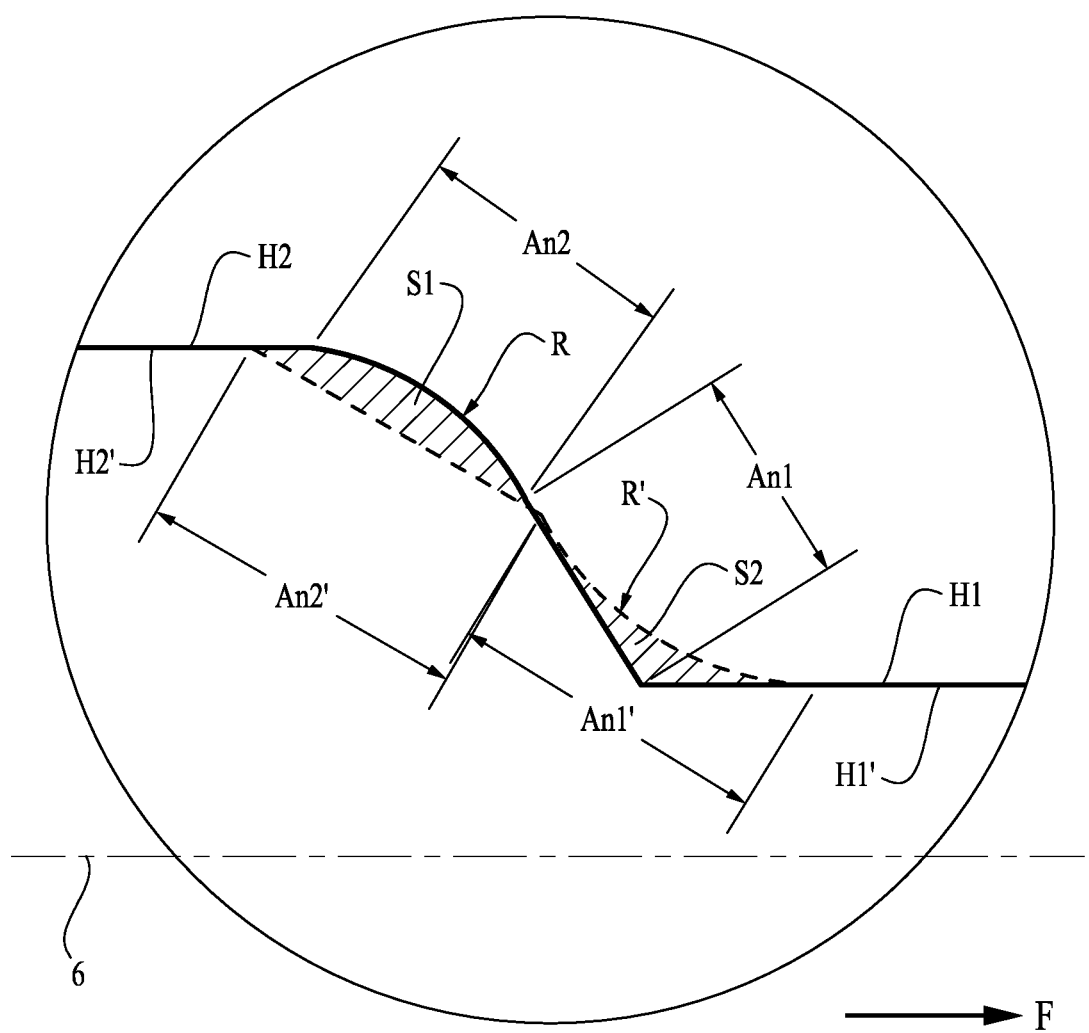

In FIG. 19, horizontal edge sections H1, H1', H2, H2' on the same side adjoining the two cutting edges An, A'n may have the same radial dimension, so that they coincide with each other after rotation. The first cutting edge segment An1 of the first cutting edge An is a straight line section, while the second cutting edge segment An2 of the first cutting edge An is a convex curved line section with a curvature radius R; the first cutting edge segment An1' of the second cutting edge An' is a concave curved line section with a curvature radius R', while the second cutting edge segment An2' of the second cutting edge An' is a straight line section. Each cutting edge has an extension section S1, S2 or cutting edge cutting area S1, S2 which are adjacent to each other.

In other embodiments, for the step sections Tn other than the n-th step section Tn, for example, adjacent to it, the tooth profile or structure of its first cutting edge may be different from that of the first cutting edge An on the nth step section Tn, and/or the tooth profile or structure of its second cutting edge may be the different from that of the second cutting edge An' on the n-th step section Tn. For example, these differences can be reflected in the number or length or area or arrangement of each cutting edge segment An1, An2, An1', An2', the magnitude of entering/auxiliary angle λ, etc. FIGS. 13-19 illustrate some of these variabilities.

In other embodiments, the cutting edges on only part of the step sections Tn of the step drill bit 1 may be designed as the above-mentioned multi-segment style combined edge, while the cutting edges on other step sections Tn may also be arranged in the initial one-segment style structure.

Referring to the above description of the embodiments, characteristics of the step drill bit 1 with combined cutting edges according to the present invention include:
  (1) changing the initial one-section line (straight line or curved line) cutting edge into at least two sections of multi-segment (straight lines or curved lines) cutting edge, total length of the cutting edge being greater than that of the initial cutting edge, such that cutting force borne (loaded) per unit edge length is reduced, and cutting heat is then dispersed.
  (2) particularly, the primary or auxiliary angle λn has a significant change such that it may change the direction of the cutting force and has an effect of chip shunting. Besides, edge inclination angle (spiral angle) On of each cutting edge segment An1, An2, An1', An2' may also vary, such that it may change the direction of chip discharging.

(3) at least two straight line or curved line major cutting edges on the same step section Tn are different from each other in structure or tooth shape, for example, the length and/or inclination angle and even the number of each section of the multi-section line edge are different.

A prominent feature of the step drill bit 1 with combined edges is that it changes the initial edge length of each cutting edge and the angle value of each cutting angle, thus changing the initial state during the process of cutting, which correspondingly brings about the following advantageous effects:

1. the cutting force is reduced, the power is saved, and the processing range can be increased by using the same cutting tool;
2. sharpness of cutting is improved, processing efficiency is improved, and the use value of cutting tool is also improved;
3. chip breaking is easy, so as to facilitate timely chip removal and cutting chip heat dispersion in time. Timely removal of the chips creates a larger cooling space;
4. the service life of the cutting tool is prolonged, which is beneficial to long-time processing;
5. as compared with a conventional step drill bit, a thicker plate can be drilled at one time.

In addition, as compared with a large cutting area of a conventional one-segment style cutting edge, according to the present invention, a multi-segment style cutting edge and a multi-segment cutting edge or one-segment style cutting edge can be combined with each other to produce a compound cutting action. In the prior art, material is completely cut all at once along a length of the cutting edge, but in the present invention, the material is cut in multiple sections. Therefore, it can produce the effect of reduced cutting force per unit of edge length. The cutting area borne by each cutting edge is small, such that only a reduced cutting force is needed during cutting. Additionally, a chip shunting effect can be produced more easily. By controlling the cutting angle of each section, burrs and the like can be well controlled.

The present invention may include any feature or combination of features implicitly or explicitly disclosed herein or a generic concept thereof, and is not limited to any defined scope as listed above. Any elements, features and/or structural arrangements described herein may be combined in any suitable manner.

The specific embodiments disclosed above are merely exemplary, and it will be apparent to those skilled in the art who benefit from the teachings herein that the present invention can be modified and implemented in different but equivalent manners. It is therefore obvious that changes and modifications can be made to the specific embodiments as disclosed above, and all these variations are considered to fall within the scope and spirit of the present invention.

What is claimed is:

1. A step drill bit comprising:
    a) a processing portion configured for drilling and reaming a material, the processing portion comprising:
        i) a drill tip; and
        ii) a reaming portion having a plurality of steps, each step having:
            (1) a diameter;
            (2) a truncated cone section; and
            (3) an adjacent cylindrical section;
            wherein each step is successively adjacent one another and the diameter of each step increases against a drilling direction of the drill bit;
    b) a shank portion;
    c) a first chip-discharging flute and a second chip-discharging flute extending along the processing portion of the drill bit;
    d) a first cutting edge having a first tooth profile formed by the first flute and the truncated cone section of the plurality of steps; and
    e) a second cutting edge having a second tooth profile formed by the second flute and the truncated cone section of the plurality of steps,
        wherein the first cutting edge and the second cutting edge are spaced apart from each other in a circumferential direction around the drill bit and are at least partially different from each other in shape,
        wherein at least one of the first and second tooth profiles comprises multi-segment cutting edges, and wherein at least two segments of said multi-segment cutting edge are immediately adjacent to one another.

2. The drill bit of claim 1, wherein one of the first and second tooth profiles is a one-segment cutting edge, and the other of the first and second tooth profiles is a multi-segment cutting edge.

3. The drill bit of claim 2, wherein the multi-segment tooth profile comprises at least one straight-line cutting edge segment and at least one curved-line cutting edge segment.

4. The drill bit of claim 2, wherein the multi-segment tooth profile comprises multiple straight-line segments or multiple curved-line segments, and the multiple segments are either aligned or misaligned with each other.

5. The drill bit of claim 2, wherein each segment has a length that is different from a length of an-other segment.

6. The drill bit of claim 1, wherein both the first and second tooth profiles are multi-segment cutting edges.

7. The drill bit of claim 6, wherein the multi-segment tooth profiles comprise at least one straight-line cutting edge segment and at least one curved-line cutting edge segment.

8. The drill bit of claim 6, wherein the multi-segment tooth profile comprises multiple straight-line segments or multiple curved-line segments, and the multiple segments are either aligned or misaligned with each other.

9. The drill bit of claim 6, wherein each segment has a length that is different from a length of an other segment.

10. The drill bit of claim 1, wherein there are more than two chip-discharging flutes forming more than two cutting edges in each truncated cone section.

11. The drill bit of claim 1, wherein the first and second chip-discharging flutes are curved line flutes and the first and second cutting edges comprise at least one curved line segment.

12. The drill bit of claim 1, wherein the first and second chip-discharging flutes are straight flutes and the first and second cutting edges comprise at least one straight line segment.

13. The drill bit of claim 1, wherein the first and second chip-discharging flutes are spiral flutes.

14. The drill bit of claim 1, wherein each cutting edge comprises a first horizontal edge section before the tooth profile, and a second horizonal section after the tooth profile, forming a pair of first horizontal sections and a pair of second horizontal sections, and each section of each pair is parallel to one another.

15. A method of drilling a material using a step drill bit wherein a cutting force born by each cutting edge of the step drill is reduced, the method comprising the steps of:
   a) providing a step drill bit comprising:
      i) a processing portion configured for drilling and reaming a material, the processing portion comprising:
         (1) a drill tip; and
         (2) a reaming portion having a plurality of steps;
         wherein each step is successively adjacent one another and a diameter of each step increases against a drilling direction of the drill bit;
      ii) a shank portion;
      iii) a first chip-discharging flute and a second chip-discharging flute extending along the processing portion of the drill bit;
      iv) a first cutting edge formed by the first flute and the plurality of steps; and
      v) a second cutting edge formed by the second flute and the plurality of steps, wherein the first cutting edge and the second cutting edge are spaced apart from each other in a circumferential direction around the drill bit, wherein at least one of the first and second cutting edges comprises multi-segment cutting edges, and wherein at least two segments of said multi-segment cutting edge are immediately adjacent to one another;
   b) providing a material;
   c) cutting a first portion of the material using the first cutting edge, wherein the first portion extends over only part of the length of the first cutting edge and a cutting force borne by the first cutting edge is reduced; and
   d) cutting a second portion of the material using the second cutting edge, wherein the second portion extends over only part of a length of the second cutting edge and a cutting force borne by the second cutting edge is reduced.

16. The method of claim 15, wherein one of the cutting edges is a one-segment cutting edge, and the other cutting edge is a multi-segment cutting edge.

17. The method of claim 16, wherein the multi-segment cutting edge comprises at least one straight-line cutting edge segment and at least one curved-line cutting edge segment.

18. The method of claim 15, wherein both the first and second cutting edges are multi-segment cutting edges.

19. The method of claim 18, wherein the multi-segment cutting edges comprises at least one straight-line cutting edge segment and at least one curved-line cutting edge segment.

20. A method of drilling a material using a step drill bit wherein heat produced by the step drill is dispersed along two or more cutting edges at each step, the method comprising the steps of:
   a) providing a step drill bit comprising:
      a. a processing portion configured for drilling and reaming a material, the processing portion comprising:
         i. a drill tip; and
         ii. a reaming portion having a plurality of steps;
         wherein each step is successively adjacent one another and a diameter of each step increases against a drilling direction of the drill bit;
      b. a shank portion;
      c. a first chip-discharging flute and a second chip-discharging flute extending spirally along the processing portion of the drill bit;
      d. a first cutting edge formed by the first flute and the plurality of steps; and
      e. a second cutting edge formed by the second flute and the plurality of steps, wherein the first cutting edge and the second cutting edge are spaced apart from each other in a circumferential direction around the drill bit, wherein at least one of the first and second cutting edges comprises multi-segment cutting edges, and wherein at least two segments of said multi-segment cutting edge are immediately adjacent to one another;
   b) providing a material;
   c) cutting a first portion of the material using the first cutting edge, wherein the first portion extends over only part of the length of the first cutting edge and heat produced by the cutting drill is dispersed along the first cutting edge; and
   d) cutting a second portion of the material using the second cutting edge, wherein the second portion extends over only part of a length of the second cutting edge and heat produced by the step drill is dispersed along the second cutting edge.

21. The method of claim 20, wherein one of the cutting edges is a one-segment cutting edge, and the other cutting edge is a multi-segment cutting edge.

22. The method of claim 21, wherein the multi-segment cutting edge comprises at least one straight-line cutting edge segment and at least one curved-line cutting edge segment.

23. The method of claim 20, wherein both the first and second cutting edges are multi-segment cutting edges.

24. The method of claim 23, wherein the multi-segment cutting edges comprises at least one straight-line cutting edge segment and at least one curved-line cutting edge segment.

* * * * *